(12) United States Patent
Satou

(10) Patent No.: US 6,893,064 B2
(45) Date of Patent: May 17, 2005

(54) BUMPER STRUCTURE

(75) Inventor: Kenichi Satou, Tokyo (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/091,470

(22) Filed: Mar. 7, 2002

(65) Prior Publication Data
US 2002/0125725 A1 Sep. 12, 2002

(30) Foreign Application Priority Data
Mar. 8, 2001 (JP) .................................. P. 2001-065291

(51) Int. Cl.[7] .............................................. B60R 19/18
(52) U.S. Cl. .................. 293/132; 293/155; 296/187.04; 296/187.09
(58) Field of Search ............................ 293/15, 38, 102, 293/120–122, 132, 133, 142–144, 155; 296/189, 187.04, 187.09, 193.07; 280/69.1

(56) References Cited

U.S. PATENT DOCUMENTS 4,326,445 A * 4/1982 Bemiss ...................... 89/36.08
5,724,925 A * 3/1998 Ito ........................... 180/68.1 X
6,467,822 B1 * 10/2002 Leng ........................... 293/121
6,540,275 B1 * 4/2003 Iwamoto et al. .............. 293/24

FOREIGN PATENT DOCUMENTS

| EP | 1 065 108 A2 | 6/2000 | |
| EP | 1 036 715 A2 | 9/2000 | |
| EP | 1 065 108 A3 | 9/2001 | |
| GB | 2235032 | * 2/1991 | ................ 293/133 |
| JP | 2000-006739 A | 1/2000 | |

* cited by examiner

Primary Examiner—Dennis H. Pedder
(74) Attorney, Agent, or Firm—McGinn & Gibb, PLLC

(57) ABSTRACT

A front portion of an under cover fastened to a cross member extends to the front, so that the extension is formed as a mounting bracket for a bumper face. A lower impact absorbing member is integrally formed on the bracket which lower impact absorbing member has a rib provided to erect from the bracket in such a manner as to be opposed to an inner vertical surface of a lower protruding portion of the bumper face and a plurality of beads disposed behind the rib for transmitting an impact from the rib to the cross member, to thereby provide a bumper structure with appropriate impact absorbing function at a lower portion thereof, with a simple structure and without increasing the number of components.

25 Claims, 6 Drawing Sheets

BUMPER STRUCTURE

BACKGROUND OF THE INVENTION

The present invention relates to a bumper structure in which an impact can be absorbed even at a lower portion of a bumper.

In recent years, there have been proposed front bumpers for vehicle bodies in each of which protection of a pedestrian is taken into consideration. The front bumpers are formed in such a manner that an impact can be absorbed at a lower portion of the bumper as well as at an upper portion thereof.

In a bumper structure like this, for example, in Japanese Patent Laid-open-2000-6739, it is disclosed a technology in which a bracket is interposed between a bumper face and a cross member so that it fastens a lower portion of the bumper face to the cross member on a vehicle body. The bracket has a plurality of mounting surfaces to overlap a front surface of the cross member. The bracket has pairs of vertical surfaces extending forward from both sides of the respective mounting surfaces in a direction substantially normal to a transverse direction of the vehicle. The mounting surfaces and the vertical surfaces are formed integrally with the bracket. The cross member is mounted to the bracket at the mounting surface. According to this technology, the respective vertical surfaces function as impact absorbing members at the lower portion of the bumper face.

However, interposing the bracket between the bumper face and the cross member, as described above, causes an increase in the number of components and results in a complicated structure. Namely, in the bumper structure in which no impact absorbing function is provided at the lower portion of the bumper, it is a general practice to fasten the lower portion of the bumper face directly to the cross member. Therefore, as compared with the bumper structure without the impact absorbing function, the bumper structure with the impact absorbing function, which described above and provided at the lower portion of the bumper, has an increase in the number of components.

In contrast, it may be possible to form the impact absorbing member integrally with the lower portion of the bumper face and mount the lower portion of the bumper face directly to the cross member without using a bracket. However, it is difficult to form such an impact absorbing member integrally with the lower portion of the bumper face. Even if it were possible to form the impact absorbing member integrally with the lower portion of the bumper face, it would be difficult to tune the strength of the lower portion of the bumper in such a bumper structure.

SUMMARY OF THE INVENTION

The present invention was made in these situations, and an object of the present invention is to provide a bumper structure in which a lower portion of a bumper face can fasten to a cross member. The object of the present invention is also to provide an appropriate impact absorbing function at the lower portion of the bumper face with a simple structure and without increasing the number of components.

With a view to solving the problems, according to a first aspect of the present invention, there is provided a bumper structure comprising: a bumper face; a cross member mounted on a vehicle body; an under cover disposed at a lower portion of the vehicle body, and extended forward so as to become a bracket for fastening a lower portion of the bumper face to the cross member; and a lower impact absorbing member formed integrally with the under cover, and disposed between the lower portion of the bumper face and the cross member for absorbing an impact between the cross member and the bumper face.

According to a second aspect of the present invention, there is provided a bumper structure as set forth in the first aspect of the present invention, wherein the lower impact absorbing member comprises: a rib provided to be opposed to the lower portion of the bumper face; and a plurality of beads disposed between the rib and the cross member for transmitting the impact from the rib to the cross member, and wherein the rib and the beads are formed integrally with the under cover.

According to a third aspect of the present invention, there is provided a bumper structure as set forth in the second aspect of the present invention, wherein the rib extends in substantially parallel with the lower portion of the bumper face in a transverse direction of the vehicle body.

According to a fourth aspect of the present invention, there is provided a bumper structure as set forth in the second or third aspect of the present invention which further comprising: a bumper beam mounted on the vehicle body; and an upper impact absorbing member disposed between an upper portion of the bumper face and the bumper beam for absorbing impact between the bumper beam and the upper portion of the bumper face, wherein a position where the rib is disposed is forward of a predetermined position where an impact absorption by the upper impact absorbing member is saturated, when the upper impact absorbing member is pressed to the bumper beam side.

According to a fifth aspect of the present invention, there is provided a bumper structure as set forth in any one of the second to fourth aspects of the present invention, wherein the length of the rib is disposed longer than that of the cross member in a transverse direction of the vehicle body, and wherein the beads are disposed along the rib in a sectorial shape.

According to a sixth aspect of the present invention, there is provided a bumper structure as set forth in any one of the second to fifth aspects of the present invention, wherein each of the beads has a locking pawl to be locked at a locking portion protruded forward from the cross member.

According to a seventh aspect of the present invention, there is provided a bumper structure as set forth in the sixth aspect of the present invention, wherein the locking pawl is formed by cutting away a rear portion of the bead.

According to an eighth aspect of the present invention, there is provided a bumper structure as set forth in the sixth or seventh aspect of the present invention, the cross member comprising: a first member having a flange; and a second member having a flange that is joined with the flange of the first member, wherein the locking portion is formed by the flange of the first and second members.

DESCRIPTION OF THE PREDERRED EMBODIMENTS

Figure 1:
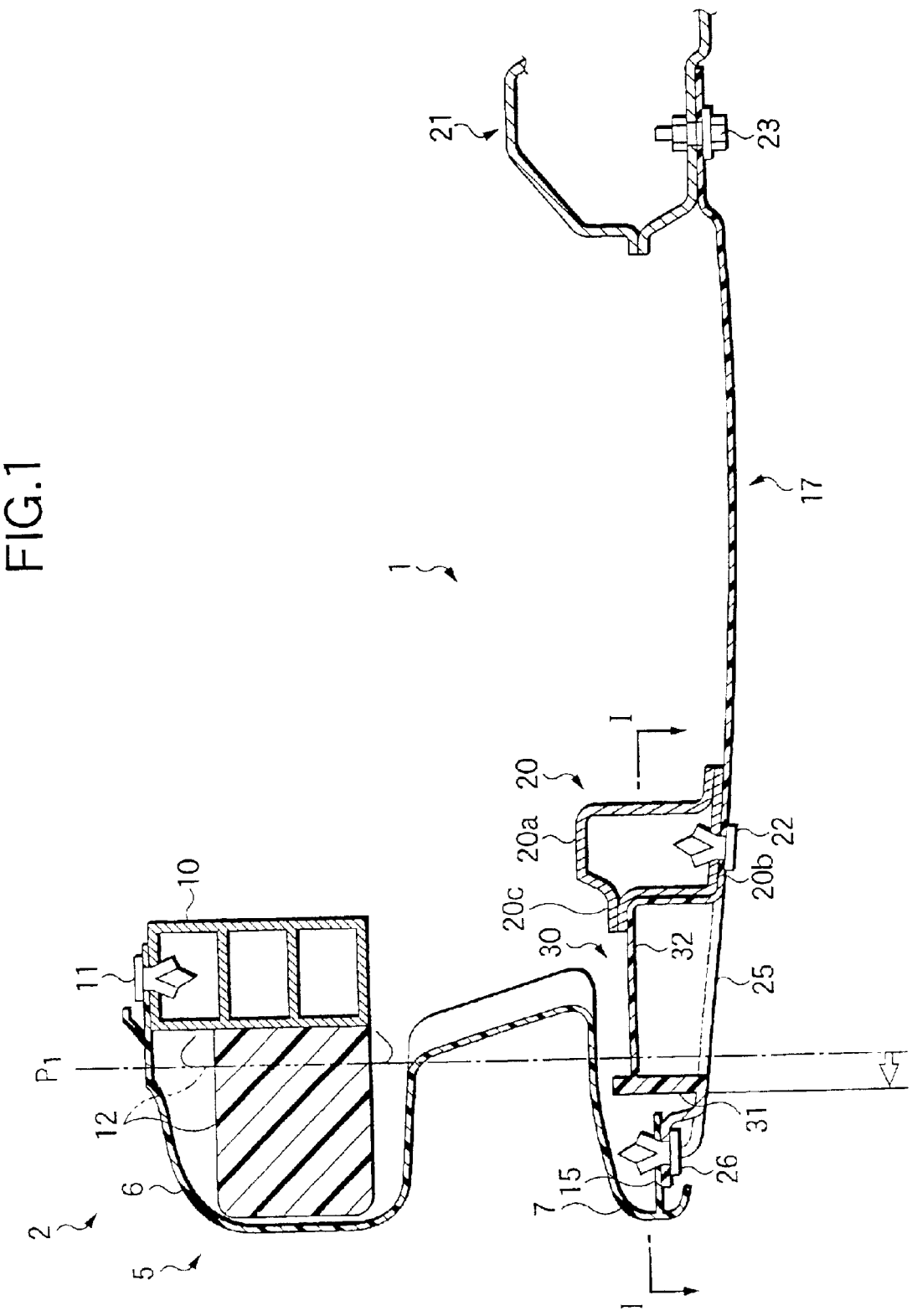
FIG. 1 is a longitudinally vertical sectional view showing a main part of a vehicle body in the vicinity of a front bumper according to a first embodiment of the present invention.
Figure 2:
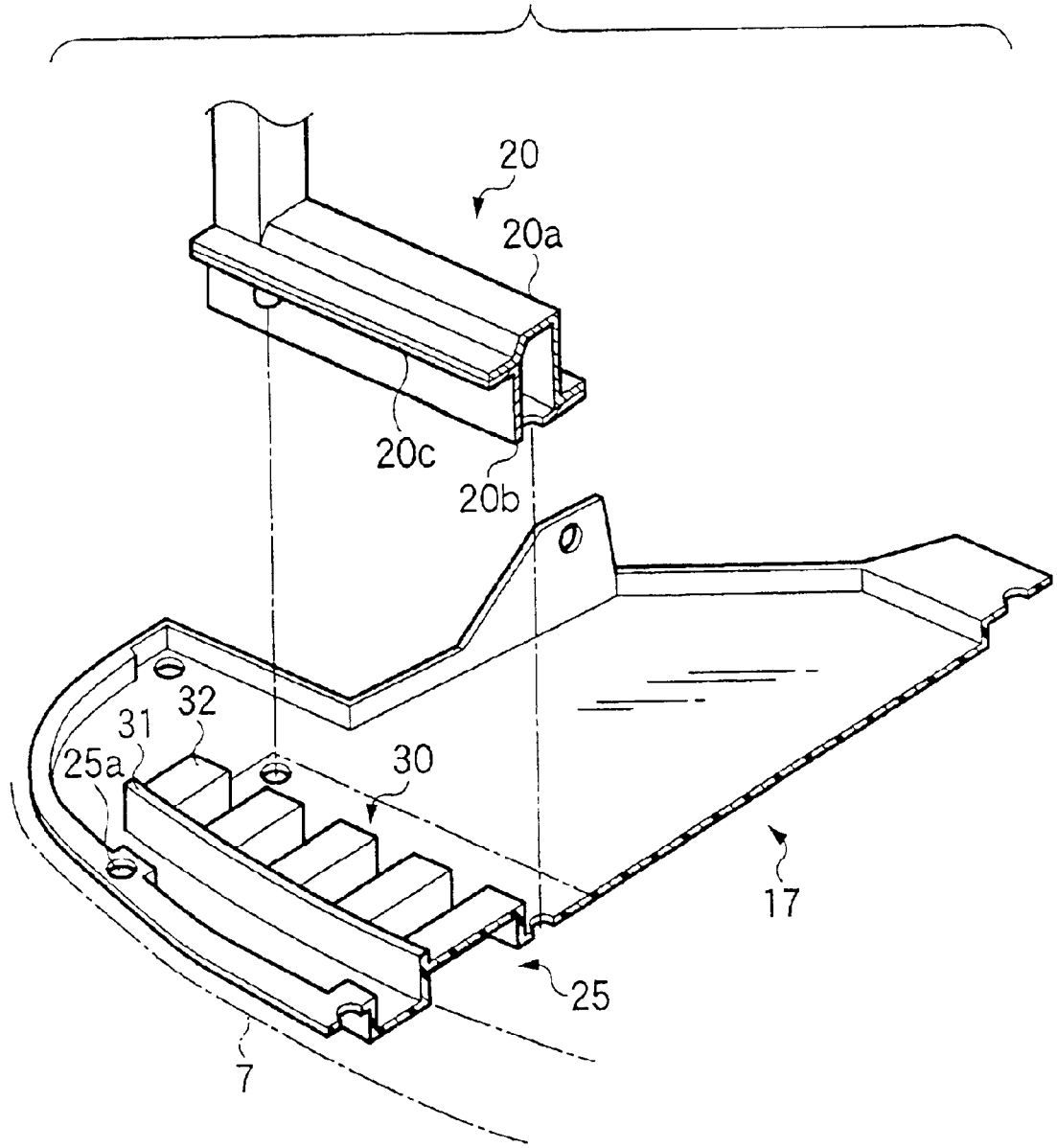
FIG. 2 is an exploded perspective view showing main parts of a cross member and an under cover according to the first embodiment of the present invention.
Figure 3:
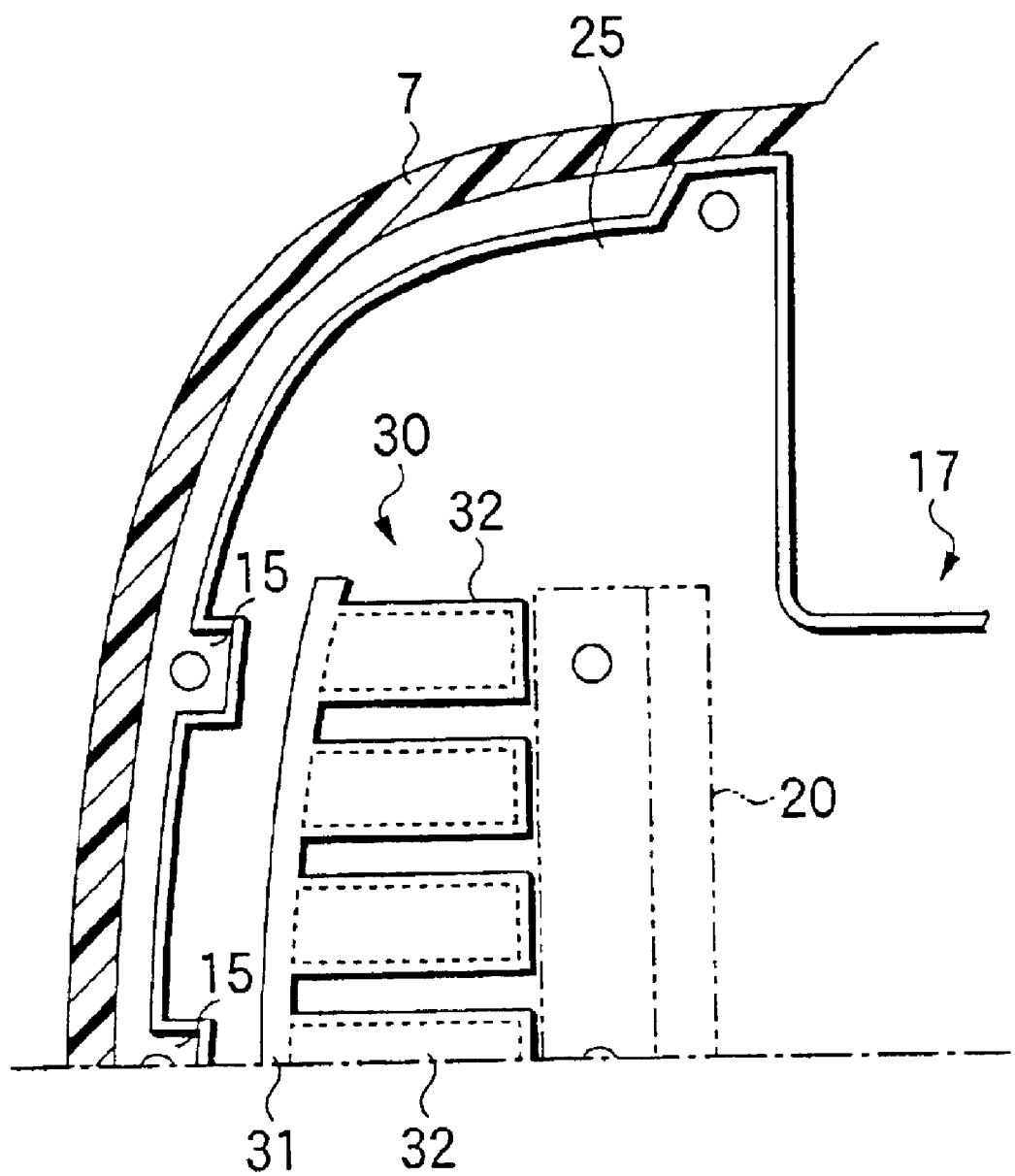
FIG. 3 is a plan view showing the main part of the under cover according to the first embodiment of the present invention which view corresponds to a horizontal sectional view taken along the line I—I in FIG. 1.

Referring to the appended drawings, a mode for carrying out the present invention will be described below. FIGS. 1 to 4 show a first embodiment of the present invention. FIG. 1 is a longitudinally vertical sectional view showing a main part of a vehicle body in the vicinity of a front bumper. FIG. 2 is an exploded perspective view of a cross member and an under cover. FIG. 3 is a plan view showing the main part of the under cover which corresponds to a horizontal sectional view taken along the line I—I in FIG. 1. FIG. 4 is longitudinally vertical sectional view showing a main part of a lower portion of the bumper.

In FIG. 1, reference numeral 1 denotes a vehicle body and reference numeral 2 denotes a front bumper disposed at a front end of the body 1.

The front bumper 2 has a bumper face 5 made from resin. The bumper face 5 has an upper protruding portion 6 and a lower protruding portion 7, which protrude at positions spaced a predetermined interval each other in a vertical direction of the bumper face 5. Therefore, the front bumper 2 is designed to hit against legs of a pedestrian at first, when the pedestrian is hit from the front face of the vehicle.

An upper portion of the bumper face 5 extends to a rear of the body 1 from a top of the upper protruding portion 6 and is fixedly mounted to a bumper beam 10 of the body 1 through clips 11. In addition, an upper impact absorbing member 12 made of foamed resin etc. is fixedly provided on a front side of the bumper beam 10, so that the upper impact absorbing member 12 is accommodated in the upper protruding portion 6.

On the other hand, a plurality of protruding pieces 15 are formed on an inner surface of the lower protruding portion 7. These protruding pieces 15 are fastened to the body 1 through a resin under cover 17 fixedly provided at a lower portion of the body 1.

To describe specifically, a cross member 20 and an engine cross member 21 are disposed at the lower portion of the body 1. The cross member 20 is at a forward portion of the vehicle and the engine cross member 21 is at a rear portion of the cross member 20. A front portion of the under cover 17 is fastened to the cross member 20 through clips 22, whereas a rear portion of the under cover 17 is fastened to the engine cross member 21 through a bolt 23.

The front portion of the under cover 17 extends forward further than the cross member 20 so that the extended portion of the under cover becomes a mounting bracket 25 for the bumper face 5. The bracket 25 faces the inner surface of the lower protruding portion 7 of the bumper face 5. The protruding pieces 15 of the lower protruding portion 7 are fastened to the bracket 25 at hole portions 25a formed in a distal end of the bracket 25 through clips 26. In other words, the lower portion of the bumper face 5 is fastened to the cross member 20 of the body 1 through the bracket 25 extending from the under cover 17.

In addition, a lower impact absorbing member 30 is integrally formed on the bracket 25, so that the lower impact absorbing member 30 is accommodated in the lower protruding portion 7. The lower impact absorbing member 30 has a rib 31 raised from the bracket 25 so as to be opposed to an inner vertical surface of the lower protruding portion 7 and a plurality of beads 32. The beads 32 are disposed between the rib 31 and the cross member 20 for transmitting an impact from the rib 31 to the cross member 20.

As shown in FIGS. 2, 3, a length of the rib 31 in the transverse direction of the vehicle is set so as to substantially correspond to a transverse length of the cross member 20. In addition, the rib 31 is extended along the inner vertical surface of the lower protruding portion 7 in substantially parallel therewith and spaced a predetermined interval from the inner vertical surface. Here, as shown in FIG. 1, the rib 31 is disposed forward of a position $P_1$ where impact absorption by the upper impact absorbing member 12 is saturated.

As shown in FIGS. 2, 3, the beads 32 are hollow rectangular protruding members extending in the longitudinal direction of the body 1. The beads 32 are formed integrally with the rib 31 at front end portions thereof, whereas the beads 32 abut on a front side of the cross member 20 at rear end portions thereof.

Here, the cross member 20 has an upper member 20a, a lower member 20b and a flange joined portion 20c. The upper member 20a and the lower member 20b are joined together at front portions of the upper and lower members. In addition, the upper member 20a and the lower member 20b are also joined together at rear portions of the upper and lower members. Then, flanges are formed at the front portion and the rear portion respectively. The flange joined portion 20c located on a front side of the cross member 20. Upper surfaces of the respective beads 32 are abutted with a flange joined portion 20c on a front side of the cross member 20.

Figure 4A:
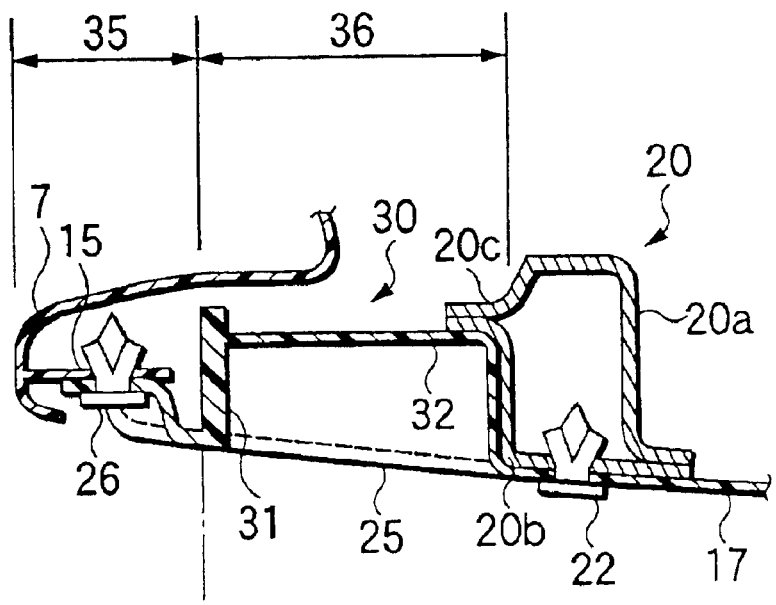
FIG. 4 is a longitudinally vertical sectional view showing a main part of a lower portion of a bumper according to the first embodiment of the present invention.
Figure 4B:
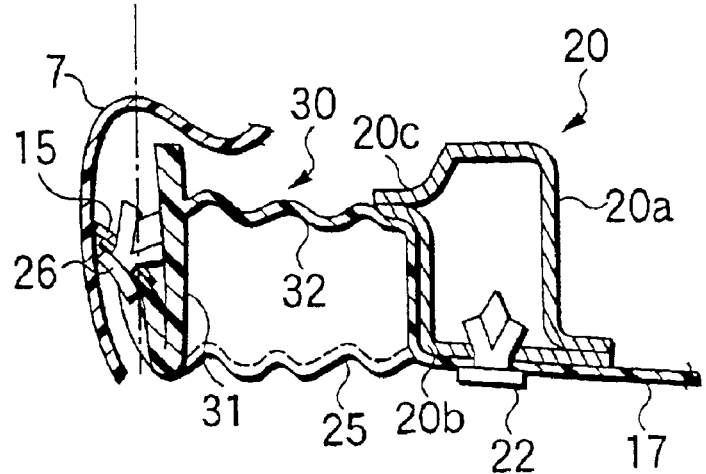

Then, as shown in FIG. 4A, the lower impact absorbing member 30 forms a low impact absorbing zone 35 and a high impact absorbing zone 36 in the interior of the lower protruding portion 7 by the rib 31 and the beads 32. Here, a strength of the high impact absorbing zone 36 is set greater than that of the upper impact absorbing member 12 by the rib 31 and the beads 32.

Next, the operation of the front bumper 2 described heretofore will be described below.

In a case that the pedestrian is hit from the front face of the vehicle, the legs of the pedestrian are hit first by the upper protruding portion 6 and the lower protruding portion 7 formed on the bumper face 5 of the front bumper 2.

Portions of the legs near the knees are hit mainly by the upper protruding portion 6, then the upper protruding portion 6 is deformed to the rearwards of the body 1 while absorbing an impact from the portion of the leg near the knee. Furthermore, the impact is then transmitted to the upper impact absorbing member 12, then the upper impact absorbing member 12 is deformed while absorbing the impact.

Simultaneously, portions of the legs below the knees are hit mainly by the lower protruding portion 7. Then, the lower protruding portion 7 is deformed to the rearwards of the body 1 while absorbing an impact from the portions of the legs below the knees at the lower impact absorbing zone 35. When the impact absorption at the low impact absorbing zone 35 is saturated, the impact is then absorbed by the high impact absorbing zone 36 (refer to FIG. 4B).

Here, an impact absorption initiating position (where the rib 31 is disposed) of the high impact absorbing zone 36 is set forwarder than the position where impact absorption by the upper impact absorbing member 12 is saturated. In addition, strength of the high impact absorbing zone 36 is set greater than that of the upper impact absorbing member 12 by the rib 31 and the beads 32. Therefore, the lower protruding portion 7 scoops the leg portions below the knees while absorbing a predetermined degree of impact at the high impact absorbing zone 36. Herewith, the pedestrian is led onto the hood of the engine compartment without a risk that the legs of the pedestrian are involved under the body 1. Consequently, a damage that would otherwise be made to the knee joints of the pedestrian is effectively reduced.

In addition, since the upper surfaces of the beads 32 are abut with the flange joined portion 20c, at the time that the impact is absorbed, the upward movement of the beads 32 is regulated. In a case that an impact, which is larger than an impact resulting when the pedestrian is hit against the vehicle, is applied to the front bumper 2, the under cover 17 drops off from the body as quickly. After the impact absorption by the high impact absorbing zone 36 is saturated, the impact is reduced.

According to the embodiment, the front portion of the under cover 17 is extended so as to become the mounting bracket 25 for the bumper face 5. In addition, the lower impact absorbing member 30 is formed integrally on the bracket 25. Therefore, the lower portion of the bumper face 5 is fastened to the cross member 20 of the body 1 without increasing the number of components and with the simple structure. Moreover, the appropriate impact absorbing function can be provided at the lower portion of the bumper face 5.

In this case, the lower impact absorbing member 30 has the rib 31 provided to raised from the bracket 25 to be opposed to the inner vertical surface of the lower protruding portion 7 and the plurality of beads 32 disposed behind the rib 31 in the longitudinal direction of the vehicle. Therefore, the impact absorbing function of the lower portion of the bumper face 5 can be adjusted easily and stably by modifying the positions where the rib 31 and the beads 32 are disposed, the thickness of the rib 31 and the beads 32 and the number of beads 32.

In addition, the rib 31 is extended along the inner vertical surface of the lower portion of the bumper face 5 (the inner vertical surface of the lower protruding portion 7) in substantially parallel therewith. Therefore, unevenness in impact absorbing capability that would occur from different impact positions on the lower protruding portion 7 can be prevented.

Furthermore, the rib 31 is disposed forwarder than the position where the impact absorption by the upper impact absorbing member 12 is saturated. Therefore, in case a pedestrian is hit by the vehicle, the leg portions below the knees of the pedestrian can be scooped while the impact is being absorbed by the high impact absorbing zone 36. Herewith, the pedestrian can be led onto the hood of the engine compartment without the risk that the leg portions below the knees of the pedestrian are involved under the body. Namely, it is possible to effectively reduce the damage to the knee joints of the pedestrian.

Figure 5:
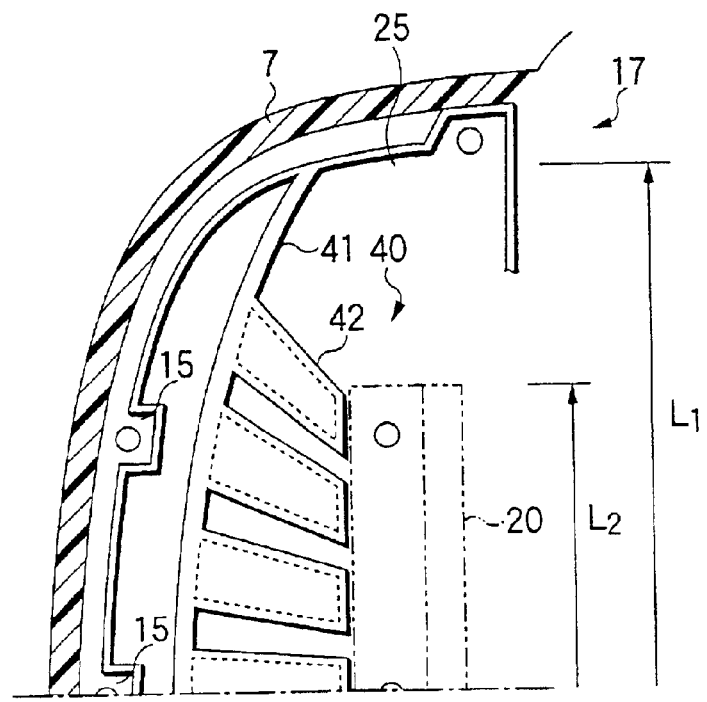
FIG. 5 is a plan view showing a main part of an under cover according to a second embodiment of the present invention.

Next, FIG. 5 shows a second embodiment of the present invention, being a plan view showing a main part of an under cover. Note that in this embodiment of the present invention, the structure of a lower impact absorbing member provided on a bracket 25 is different from that described in the first embodiment. The other features remain the same, and the description thereof will be omitted by imparting like reference numerals to like constituent components.

Namely, as shown in FIG. 5, a lower impact absorbing member 40 according to this embodiment has a rib 41 and a plurality of beads 42. The rib 41 is raised from the bracket 25 to be opposed to an inner vertical surface of a lower protruding portion 7. The plurality of beads 42 are disposed between the rib 41 and a cross member 21 for transmitting an impact from the rib 41 to the cross member 20.

The rib 41 is extended along the inner vertical surface of the lower protruding portion 7 in substantially parallel therewith and spaced a predetermined interval from the inner vertical surface. Here, a substantially transverse length $L_1$ of the rib 41 is set to be longer than a transverse length $L_2$ of the cross member 20.

In addition, the beads 42 are disposed in such a manner that it was an expanded toward the front in a sectorial shape as shown FIG. 5, in association with the length $L_1$ of the rib 41 being set longer than the transverse length $L_2$ of the cross member. On the other hand, rear sides of the beads 42 are abutted with a front side of the cross member 20.

According to this embodiment, in addition to the advantages obtained in the first embodiment, there is provided an advantage that the area can be extended where impact can effectively be absorbed at the lower portion of the front bumper 2.

Figure 6:
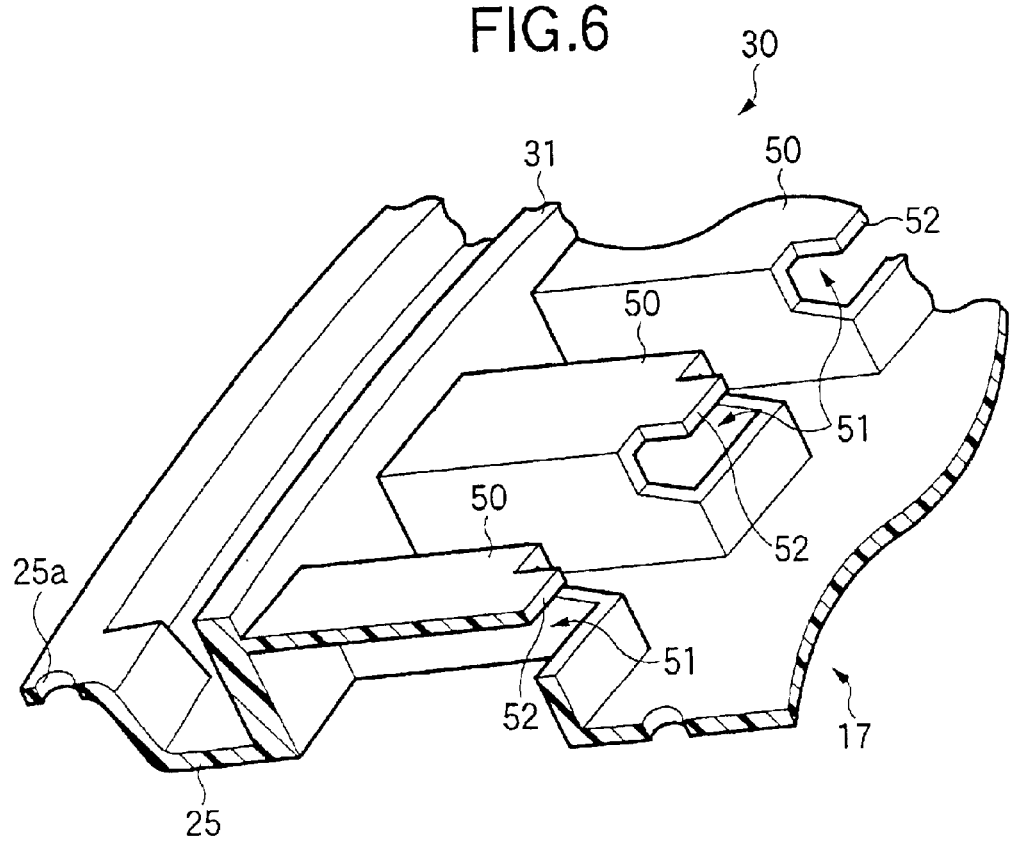
FIG. 6 is a perspective view showing a main part of an under cover according to a third embodiment of the present invention.
Figure 7:
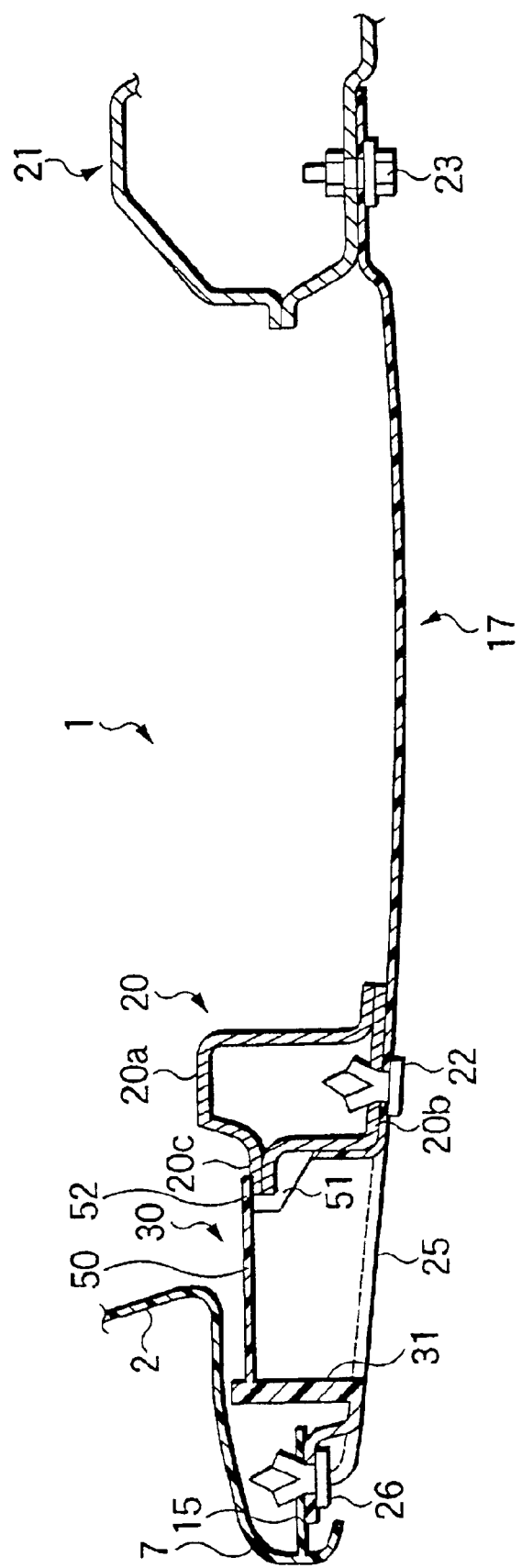
FIG. 7 is a longitudinally vertical view showing a main part of a vehicle body in the vicinity of a front bumper according to the third embodiment of the present invention.

Next, FIGS. 6, 7 show a third embodiment of the present invention. FIG. 6 is a perspective view showing a main part of a under cover of the third embodiment of the present invention. FIG. 7 is a longitudinally vertical sectional view showing a main part of a vehicle body in the vicinity of a front bumper of the third embodiment of the present invention. Note that in this embodiment the structure of beads is different from those of the beads described with reference to the first and second embodiments. The other features remain the same and therefore the description thereof will be omitted by imparting like reference numerals to like constituent components.

Namely, as shown in FIGS. 6, 7, beads 50 according to this embodiment each have a notch portion 51 in upper rear portions thereof. A locking pawl 52 is formed by the formation of the notch portion 51, which projected rearward on an upper surface of the bead 51. As shown in FIG. 7, the locking pawls 52 are locked to a flange joined portion 20c of a cross member 20 which protrudes from a front side thereof, whereby the mounting position of the beads 50 relative to the cross member 20 is regulated. Namely, in this embodiment, the flange joined portion 20c on the front side of the cross member 20 functions as a locking portion to lock the locking pawls 52.

According to this embodiment, in addition to the advantages obtained in the first and second embodiments, there is provided an advantage that the locking pawls 52 can be locked onto the flange joined portion 20c when an under cover 17 is mounted on a vehicle body 1. Namely, temporary fixation of the under cover 17 and positioning of the beads 50 relative to the cross member 20 can be facilitated.

As has been described heretofore, according to the present invention, the lower portion of the bumper face can be fastened to the cross member and the appropriate impact absorbing function can be provided at the lower portion of the bumper face with the simple structures and without increasing the number of components.

While only certain embodiments of the invention have been specifically described herein, it will apparent that numerous modifications may be made thereto without departing from the spirit and scope of the invention.

What is claimed is:

1. A bumper structure comprising:
   a bumper face;
   a cross member mounted on a vehicle body;
   an under cover disposed at a lower portion of the vehicle body, and extended forward to and from bracket for fastening a lower portion of the bumper face to the cross member; and a lower impact absorbing member formed integrally with the under cover, and disposed between the lower portion of the bumper face and the cross member for absorbing an impact between the cross member and the bumper face, wherein the lower impact absorbing member comprises a plurality of beads formed integrally with the under cover, and wherein each of the beads comprises a locking pawl locked to the cross member.

2. The bumper structure as set forth in claim 1, wherein the lower impact absorbing member further comprises:

a rib opposed to the lower portion of the bumper face, wherein the plurality of beads are disposed between the rib and the cross member for transmitting the impact from the rib to the cross member, and wherein the rib is formed integrally with the under cover.

3. The bumper structure as set forth in claim 2, wherein the rib is substantially parallel with the lower portion of the bumper face in a transverse direction of the vehicle body.

4. The bumper structure as set forth in claim 2, further comprising:

a bumper beam mounted on the vehicle body; and an upper impact absorbing member disposed between an upper portion of the bumper face and the bumper beam for absorbing impact between the bumper beam and the upper portion of the bumper face, wherein a position where the rib is disposed is forward of a predetermined position where an impact absorption by the upper impact absorbing member is saturated, when the upper impact absorbing member is pressed to the bumper beam side.

5. The bumper structure as set forth in claim 3, further comprising:

a bumper beam mounted on the vehicle body; and an upper impact absorbing member disposed between an upper portion of the bumper face and the bumper beam for absorbing impact between the bumper beam and the upper portion of the bumper face, wherein a position where the rib is disposed is forward of a predetermined position where an impact absorption by the upper impact absorbing member is saturated, when the upper impact absorbing member is pressed to the bumper beam side.

6. The bumper structure as set forth in claim 2, wherein the length of the rib is longer than that of the cross member in a transverse direction of the vehicle body, and wherein the beads are disposed along the rib in a sectorial shape.

7. The bumper structure as set forth in claim 5, wherein the length of the rib is longer than that of the cross member in a transverse direction of the vehicle body, and wherein the beads are disposed along the rib in a sectorial shape.

8. The bumper structure as set forth in claim 1, wherein the locking pawl is locked at a locking portion protruded forward from the cross member.

9. The bumper structure as set forth in claim 7, wherein the locking pawl is locked at a locking portion protruded forward from the cross member.

10. The bumper structure as set forth in claim 8, wherein the locking pawl comprises a notch in a rear portion of the bead.

11. The bumper structure as set forth in claim 9, wherein the locking pawl is comprises a notch in a rear portion of the bead.

12. The bumper structure as set forth in claim 8, wherein the cross member comprises:

a first member having a flange; and a second member having a flange that is joined with the flange of the first member, wherein the locking portion is formed by the flange of the first and second members.

13. The bumper structure as set forth in claim 11, wherein the cross member comprises:

a first member having a flange; and a second member having a flange that is joined with the flange of the first member, wherein the locking portion is formed by the flange of the first and second members.

14. The bumper structure as set forth in claim 1, wherein said undercover is connected to a bottom portion of said cross member.

15. The bumper structure as set forth in claim 1, wherein said undercover extends in a rearward direction from said cross member.

16. The bumper structure as set forth in claim 15, wherein said undercover extends along a bottom of the vehicle in said rearward direction and is secured to a second cross member.

17. The bumper structure as set forth in claim 4, wherein said upper impact absorbing member comprises foamed resin.

18. The bumper structure as set forth in claim 5, wherein said upper impact absorbing member comprises foamed resin.

19. The bumper structure as set forth in claim 1, wherein said under cover is fastened to the cross member by a plurality of clips.

20. The bumper structure as set forth in claim 2, wherein said plurality of beads comprise hollow, substantially rectangular protruding members.

21. The bumper structure as set forth in claim 2, wherein said lower impact absorbing member comprises:

a low impact absorbing region disposed forward of said rib; and a high impact absorbing region disposed between said rib and said cross member.

22. The bumper structure as set forth in claim 4, wherein a strength of said lower impact absorbing member is greater than a strength of said upper impact absorbing member.

23. The bumper structure as set forth in claim 5, wherein a strength of said lower impact absorbing member is greater than a strength of said upper impact absorbing member.

24. The bumper structure as set forth in claim 1, wherein said bumper face comprises:

an upper protruding portion; and a lower protruding portion that protrudes at a position vertically spaced at a predetermined interval from a position of said upper portion, wherein the bumper structure is designed to hit legs of a pedestrian first when the pedestrian is hit from a front of the vehicle body.

25. The bumper structure as set forth in claim 2, wherein an impact absorbing function of said lower impact absorbing member is adjustable by modifying a position of the rib and the plurality of beads.

* * * * *